US008681974B1

(12) United States Patent
Langhammer

(10) Patent No.: US 8,681,974 B1
(45) Date of Patent: Mar. 25, 2014

(54) ARRAY ENCRYPTION CORE

(75) Inventor: Martin Langhammer, Alderbury (GB)

(73) Assignee: Altera Corporation, San Jose, CA (US)

( * ) Notice: Subject to any disclaimer, the term of this patent is extended or adjusted under 35 U.S.C. 154(b) by 281 days.

(21) Appl. No.: 13/050,849

(22) Filed: Mar. 17, 2011

(51) Int. Cl.
*H04L 9/00* (2006.01)
(52) U.S. Cl.
USPC .................................. 380/28; 380/37; 380/44
(58) Field of Classification Search
USPC .............. 380/44, 45, 46, 47, 28, 37; 713/164, 713/189, 193
See application file for complete search history.

(56) References Cited

U.S. PATENT DOCUMENTS

| 6,909,785 | B1 * | 6/2005 | Rose ............................. 380/260 |
| 7,620,821 | B1 | 11/2009 | Grohoski et al. |
| 2003/0223581 | A1 * | 12/2003 | Hanounik ....................... 380/37 |
| 2007/0286416 | A1 | 12/2007 | Bertoni et al. |
| 2008/0031454 | A1 * | 2/2008 | Verbauwhede ............... 380/277 |
| 2010/0138648 | A1 * | 6/2010 | Nishikawa et al. ........... 713/151 |

* cited by examiner

*Primary Examiner* — Beemnet Dada
(74) *Attorney, Agent, or Firm* — Ropes & Gray LLP

(57) ABSTRACT

A scalable and efficient array encryption architecture is provided for encrypting data with a cryptographic algorithm using a variable number of encryption cores. The architecture can be implemented as circuitry in a fixed logic device, or can be configured into a programmable integrated circuit device such as a programmable logic device (PLD). An input arbitration logic circuit may schedule timeslots within the encryption cores to maximize system bandwidth. Each one of the encryption cores may use a plurality of pipelined registers and may support simultaneous encryption operations of multiple data blocks. Each core may provide timeslot availability signals to indicate current or anticipated availability of a timeslot for processing data in that core. The same top-level design may be used for different choices of processing depth, parallelism level, and/or system throughput.

24 Claims, 6 Drawing Sheets

ARRAY ENCRYPTION CORE

FIELD OF THE INVENTION

This invention relates generally to cryptography. More specifically, the present invention relates to an array encryption architecture with a variable number of encryption cores for implementing a cryptographic algorithm.

BACKGROUND OF THE INVENTION

Many high-speed hardware implementations of cryptographic algorithms use pipelining and/or unrolling to speed up cryptographic processing. But, while pipelining and/or unrolling certain cryptographic algorithms make for an easier-to-route, higher-performance hardware core with a small area, it often makes the interface timing very restrictive. Also, the input and output words of these methods need to interface to the hardware core within a fixed time. This inflexibility makes these hardware cores very difficult to use, and in some cases, results in a larger system than if discrete hardware cores for each individual encryption operation had been used. Another limitation of many high-speed hardware implementations of cryptographic algorithms is the lack of scalability of these implementations as higher throughputs, different speed grades, and/or different target devices are required.

Commonly-assigned U.S. patent application Ser. No. 12/650,248, which is hereby incorporated by reference herein in its entirety, describes a hardware implementation of an encryption core using pipelined registers to perform block encryption processing. The hardware core is pipelined to N levels rather than a single cycle. In addition, the hardware core can support N simultaneous encryption operations using comparable logic resources as those used when a separate core encrypts one block at a time.

SUMMARY OF THE INVENTION

The present invention relates to systems and methods for providing a scalable and efficient array encryption architecture for encrypting data with a cryptographic algorithm using a plurality of encryption cores. This architecture can be implemented as circuitry in a fixed logic device, or can be configured into a programmable integrated circuit device such as a programmable logic device (PLD).

Therefore, in accordance with embodiments of the present invention, systems and methods for encrypting data using a cryptographic algorithm are provided. Data is encrypted using a plurality of encryption cores. Each encryption core is operable to load a block of data in response to a load signal that is output by input arbitration logic. In some implementations, each encryption core may include a plurality of registers. Each register of each encryption core is operable to load a block of data during a particular timeslot in response to a respective load signal received by the register. The input arbitration logic circuitry may output the respective load signal for each one of the registers for each one of the encryption cores. Output selection logic circuitry may be coupled to the encryption cores and may output blocks of encrypted output data.

In some implementations, the input arbitration logic circuitry is operable to receive a plurality of timeslot availability signals from each encryption core. Each timeslot availability signal may indicate availability of a timeslot for loading a corresponding register in a corresponding encryption core. In some implementations, each timeslot availability signal may indicate anticipated availability of the timeslot for loading the corresponding register in the encryption core. In some implementations, each timeslot availability signal leads a current clock cycle by a plurality of clock cycles.

BRIEF DESCRIPTION OF THE DRAWINGS

Further features of the invention, its nature and various advantages will be apparent upon consideration of the following detailed description, taken in conjunction with the accompanying drawings, in which like reference characters refer to like parts throughout, and in which.

DETAILED DESCRIPTION OF THE INVENTION

Figure 1:
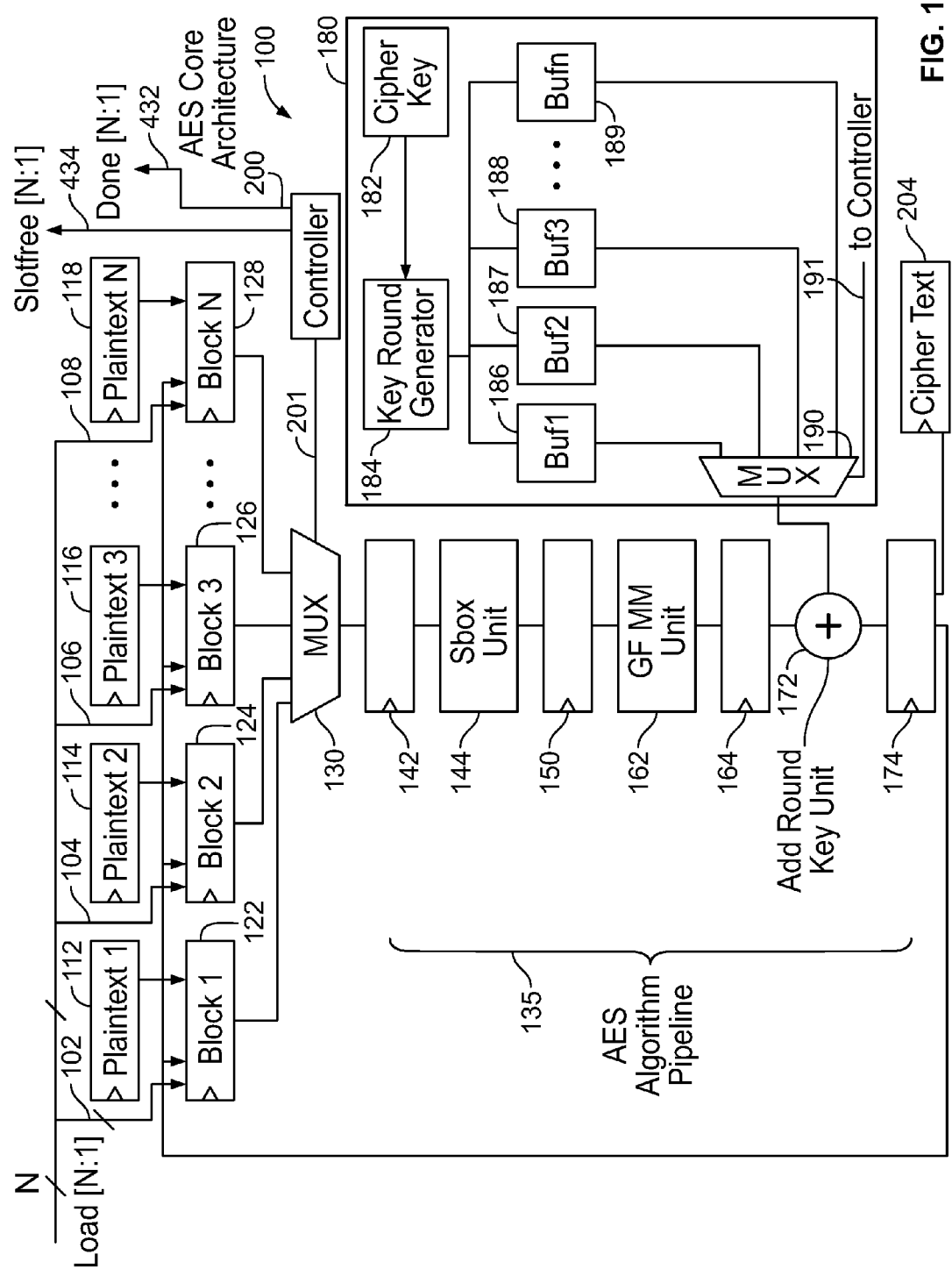
FIG. 1 is a block diagram of an encryption core architecture according to one embodiment of the invention.

FIG. 1 is a block diagram of an encryption core architecture 100 according to one embodiment of the invention.

FIG. 1 illustrates the general case where there are N blocks of data to be encrypted (i.e., plaintext), indexed 1 to N. Shown are plaintext input data blocks 112-118, the core architecture itself 122-210, and a pipeline register 174 that also serves to output ciphertext 204.

One common cryptographic encryption/decryption algorithm is a symmetric key block cipher algorithm adopted by the Department of Commerce, National Institute of Standards and Technology (NIST) as its Advanced Encryption Standard (AES). (See detailed specification in "Federal Information Processing Standards Publication 197" (FIPS 197), of Nov. 26, 2001.) The AES algorithm uses cryptographic keys of 128, 192 and 256 bits to encrypt and decrypt data in blocks of 128 bits. The algorithm iterates a number of nearly identical rounds depending on key length and block size. AES128 uses 10 rounds, AES192 uses 12 rounds and AES256 uses 14 rounds to complete an encryption or decryption operation.

Although the remainder of this specification will mainly discuss an AES embodiment, it should be understood that the invention described herein is applicable to other key lengths and block sizes as well as to other cryptographic algorithms and modes of operation.

The plaintext to be encrypted by the encryption core may be delivered to the core in any suitable fashion. For example, as shown, plaintext blocks (data blocks of 128 bits) may be input into registers 122-128. Alternatively, the input plaintext blocks may originate from a single bus or source and may be input to any of the registers 122-128 when available as explained below. Registers 122-128 are any suitable hardware register for holding a block of data. When initially loaded, each register holds the original plaintext block, but as encryption is performed on the block under the AES algorithm, each register holds the block in an intermediate encryption state (or round state).

Each register 122-128 has a separate load signal 102-108 for initializing the register with the corresponding plaintext block 112-118. As will be discussed below, system arbitration circuitry (e.g., input arbitration logic) may be used to provide these load signals.

In some embodiments, each block of data has its own done signal. For example, each register 122-128 has its own associated done signal 432 represented as an output from controller 200. Thus, the user (or any external device) of the core will know when to output a particular block and which registers can be loaded. The controller will ensure that no matter when a word is loaded, that it is not processed until its timeslot.

Multiplexer 130 controls the delivery of each block in turn into the AES algorithm pipeline 135. The controller selects the multiplexer input depending on the timeslot using a signal 201.

Register 142 is a pipeline register holding a block before delivery to S-Box unit 144. S-Box unit 144 may be a hardware-implemented unit that performs the "substitute bytes" transformation ("SubBytes") upon a given block. One of skill in the art familiar with the AES algorithm will be able to implement such a unit in hardware. For example, one hardware implementation technique implements the unit using a look up table, either using ROM memories or synthesized logic.

The second transformation, the shift rows transformation ("ShiftRows"), may be implemented through the wire connections between register 142 and unit 144, or through the connections between unit 144 and register 150. As this relatively simple transformation merely shifts rows in the data block, one of skill in the art familiar with the AES algorithm will be able to implement such a transformation in hardware with no trouble.

Register 150 is a pipeline register holding the output of unit 144 before delivery to unit 162. Galois field multiplication unit 162 is a hardware-implemented unit that performs the "mix columns" transformation ("MixColumns") upon a given block. One of skill in the art familiar with the AES algorithm will be able to implement such a unit in hardware. For example, one hardware implementation technique implements the unit using a network of shifts and XORs.

Register 164 is a pipeline register holding the output of unit 162 before delivery to unit 172. Add round key unit 172 is a hardware-implemented unit that performs the "add round key" transformation ("AddRoundKey") upon a given block. Also input to unit 172 is the appropriate round key for the current round via multiplexer 190. One of skill in the art familiar with the AES algorithm will be able to implement such a unit 172 in hardware. For example, one hardware implementation technique implements the unit using block-wide XOR logic.

Also included within encryption core architecture 100 is a controller 200 and key round generator module 180. These devices and their connections to the architecture will be explained in greater detail below. Key round generator module 180 includes key round generator 184, which may be a hardware-implemented unit that performs the key expansion routine of the AES algorithm. The key round generator takes the cipher key 182 and performs the key expansion routine to generate a key schedule. For example, the key round generator may generate 11 different round keys in the case where 10 rounds are required (one additional round key is required for an initial round key addition transformation). One of skill in the art familiar with the AES algorithm will be able to implement such a key round generator in hardware. For example, one hardware implementation technique implements the key expansion of the generator as follows. Key expansion includes a rotation of bytes in a subset of the key, "SubBytes," a sequential XORing of words in the key, and a possible addition of a variable to one of the bytes.

Buffers 186-189 are any suitable buffer for holding the round keys. For example, buffers 186-189 may be simple dual-port RAMs. They can also all be replaced by a single multi-port RAM with one write port and N read ports, but as this will be expensive or unavailable in many technologies, the present description contemplates implementation on multiple parallel RAMs. FPGAs are rich in dual-port RAMs. Buffers 186-189 may also be circular buffers. The key round generator may output each of these 11 round keys in parallel to these memories as explained below using a write address counter of controller 200. As explained below, a read counter for each memory may be used to control which round key of each buffer is input to multiplexer 190. Multiplexer 190 may be controlled by controller 200 using signal 191. There may be N key-space storage memories 186-189, one for each block.

Another way to implement the key space memories 186-189 is to use a single memory, for example, a simple dual port memory. As any key read for a particular block will only occur once per round, and this key read will be for a unique timeslot corresponding to that particular block, the read counters may be multiplexed into the read address of a single memory. The encoding scheme described here will ensure that a valid key will be read by any access, even if the key is changed (in accordance with the described invention).

Output from unit 172 is held in pipeline register 174. If a particular block (for example, block 122) has not finished being encrypted, i.e., not all 11 rounds have finished, then that block in its intermediate encrypted form is placed again into its appropriate register (for example, returned to register 122) for further encryption processing. If block 2, for example, is in its intermediate form (or round state) and arrives at register 174, it may be reloaded into register 126 to complete its encryption processing. The controller 200 controls into which register 122-128 a current block (such as block 2) may be reloaded using a valid timeslot. That is, the valid timeslot for reloading a data block may correspond to the original loading timeslot minus one (modulo N). For example, if block 1 is started in timeslot 1, block 2 in timeslot 2 . . . block 4 in timeslot 4, then a write back (reload) to block 1 is timeslot 4, block 2 is timeslot 1 . . . block 4 in timeslot 3.

Once all rounds have been completed for a particular block and upon a suitable "done" signal 432 from controller 200, the resulting ciphertext block 204 is latched from register 174 and represents an encrypted plaintext block under the AES algorithm. A user or external device may then be apprised that the ciphertext block is available for output.

Figure 2:
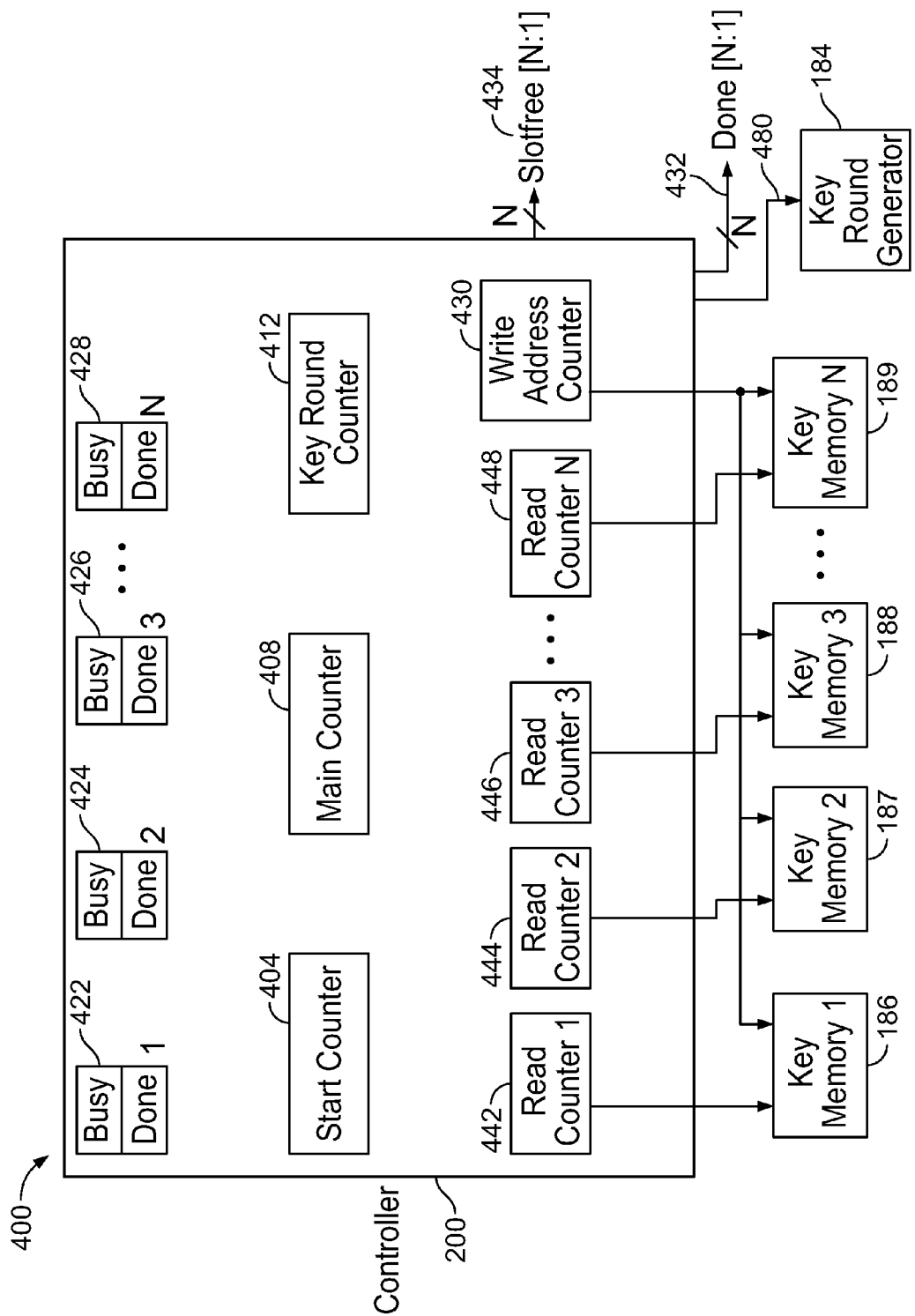
FIG. 2 illustrates a scheme for controlling the encryption core architecture according to one embodiment of the present invention.

FIG. 2 illustrates a scheme for controlling the encryption core architecture according to one embodiment of the present invention. FIG. 2 illustrates the general case where there are N blocks of data to be encrypted, indexed 1 to N. Controller 200 may include several hardware counters, a start counter 404, a main counter 408, a key round counter 412, a write address counter 430 and N read counters 442 to 442+N−1. Also included are "busy" and "done" bits for each of blocks 122-128. For example, "busy" and "done" bits 424 correspond to block 124 and indicate if that block is still being encrypted or if it is done and ready to be output as ciphertext, respectively. Shown included are read counters 442-448 (in this example), each outputting an address to each of the key space memories 186-189 to indicate from which memory address in the memory a particular round key should be read for input to multiplexer 190. A single write address counter 430 is used to indicate at which memory location in each memory a particular round key from the key round generator should be written. The implementation of the above counters in hardware will be known to those skilled in the art.

Each key memory and its associated read counter may correspond to a single one of the blocks 122-128. In other words, memory 186 (for example) may correspond to block 122 and hold the 11 round keys that will be used to encrypt that block during its 11 rounds of encryption under the AES algorithm. Read counter 442 (for example) may identify which round key from which memory location in memory 186 should be used in the add round key unit 172 when block 122 is encrypted during a particular round.

Key round generator 184 may receive information from the controller via signal lines 480. For example, the key round generator may receive the key round 412 increment signal and the generator may then generate the next key block when it changes. The received information from the controller may be used to reset the key round generator and start a new key generation cycle.

In one example, the core architecture 100 may include four pipeline stages meaning that five (N=5) simultaneous transformations may take place. In general, N input blocks correspond to N−1 pipeline stages.

Each encryption of a block of data under the AES algorithm may take 55 cycles 5 transformation steps*11 rounds), thus the average number of cycles to generate a new ciphertext from a plaintext block is the same, but the pipelining allows the system clock to run much faster. As described above, the encryption core architecture includes a controller 200 with one write address counter 430 and N read counters 442-448. N refers to the number of simultaneous encryption operations supported and is indexed 1 to N.

The write counter 430 provides a write address in parallel to each memory, writing in the generated round key for that particular round into the memory location identified by the write counter. As mentioned, it is also possible to use a single circular buffer indexed by the write counter and all four read counters, since the round keys are the same for all blocks being encrypted.

Each read counter 442-448 may start in the key round for which processing starts for that block. For example, timeslot 1 of the start counter may correspond to block 1. If block 1 is loaded when main counter=3, then the processing for block 1 will not start until main counter=5 because that is the next occurrence when timeslot 1 is available. As such, the read counter for block 1 (read counter 444) would start off equal to 1 because that is the key round in which processing for block 1 begins.

For N simultaneous encryption operations (i.e., N blocks simultaneously undergoing encryption), processing of all blocks may be started before the first one is finished in order to provide a speed advantage. If only the processing of some blocks is started, only these blocks may be encrypted simultaneously. Only one load into one of the registers 122-128 can occur per clock of the main counter, but multiple loads into these registers can occur per round. The controller 200 will ensure that processing for any block will only commence in its appropriate timeslot (i.e., the start counter of FIG. 2).

The controller 200 controls processing of a block as follows. Once a block load signal is enabled (e.g., load signal 102 for block 1 in FIG. 1), a block is loaded and its "busy" bit is set to "1." Once that block is finished, "done" is set to "1." Both "busy" and "done" are reset to "0" when that block is unloaded. If all blocks are unavailable ("busy" is "1") then a signal will be output (AND of all "busy" bits) in order to indicate that the core cannot accept data. This situation is described below with respect to the slotfree signal. This scheme will ensure that the correct blocks are loaded. The controller will kick off the read counter for a block when "busy" is "1", the corresponding timeslot comes up, and the register load signal is enabled.

When the read counter for a particular block reaches (in the case of a 128-bit cipher key where 11 rounds are used, different numbers apply in the case of 192-bit or 256-bit keys), then "done" signal value 432 is asserted. "Done" signal value 432 will be asserted when the "done" bit for a particular register (for example, shown as bits 422-428) is set, indicating that the block corresponding to that register has finished being encrypted.

In some embodiments, each register has two bits associated with it, a "busy" bit and a "done" bit shown as 422-428. The controller may assert a slotfree signal value 434 for any of the N registers if that particular register is not busy ('0'); this means that the block previously associated with that particular register has finished being encrypted and has been output into register 204. In some implementations, the controller may assert the slotfree signal value for a particular register if this particular register is not busy ('0') and the timeslot assigned to that register becomes available. In other words, the slotfree signal value for the particular register is asserted when the particular register is not busy and the associated start counter 404 reaches a valid timeslot for that particular register. Tying the slotfree signal value to timeslot availability may thus simplify the input arbitration logic, as the slotfree signal is asserted only when the register corresponding to the register corresponding to the timeslot is available. Alternatively, the slotfree signal value may anticipate the availability of a particular register. In this case, the controller may assert a slotfree signal value for a particular register if it is not busy ('0') some lead time ahead of when the timeslot assigned to that register becomes available. For example, the controller may assert the slotfree signal value for a particular register four clock cycles before the register becomes available.

For example, consider register 124. Register 124 is loaded when its corresponding load signal input 102 is enabled, for example at any time it is available, i.e., its busy bit is '0'. The read counter 444 that controls this register will not start until a valid timeslot for register 124 is available, namely main counter ticks 1, 5, 9, etc. In other words, read counter 444 will begin at the first timeslot available for this register. Processing for the block in register 124 starts the next time the associated start counter 404 reaches a valid timeslot. During these valid timeslots, multiplexer 130 at the top of pipeline 135 selects register 124 holding the current state of that particular block and allows it to enter the pipeline. Once a block enters pipeline 135, processing using the N blocks and N−1 pipeline transformation steps of the AES algorithm occurs.

Regarding operation of the key round generator and the memories, the key round generator 184 outputs 11 round keys (one key for each of the 11 rounds), one round key being output every four ticks of the main counter (for example, when there are four registers and four blocks being simultaneously encrypted). A round key is input to each of the four parallel memories at the same time. In general, if there are N blocks, then every Nth tick of the main counter a new round key will be generated and written to the memories. For example, if there are 6 registers 122-128 (and therefore 6 blocks being simultaneously encrypted) then the next round key will be generated and written at the "0" tick and the "6" tick of the main counter. This timing scheme is necessary because, assuming that all 6 blocks are loaded and ready to be processed by pipeline 135, in 6 ticks of the main counter the last block will have crossed through unit 172 and the next block (the very first block) will be ready to enter unit 172 and will need the next round key.

Once the read counter for a particular block reaches the last round number (a value of 10 in the case where 11 rounds are used), the "done" bit (bit 422, for example) for that particular block is set to '1'. Setting this bit indicates that the encryption operation for that particular block is complete. The signal "done" 432 is set if any "done" bit is set.

An encryption cycle refers to the set of encryptions for blocks 0, . . . , N−1. A new cycle starts when the next block 0 is loaded. A cycle includes a single encryption (when a single block is loaded) or will include up to N encryptions, when there are N blocks loaded. A single encryption refers to a block of data being encrypted completely (i.e., all rounds) under the AES algorithm.

Figure 3:
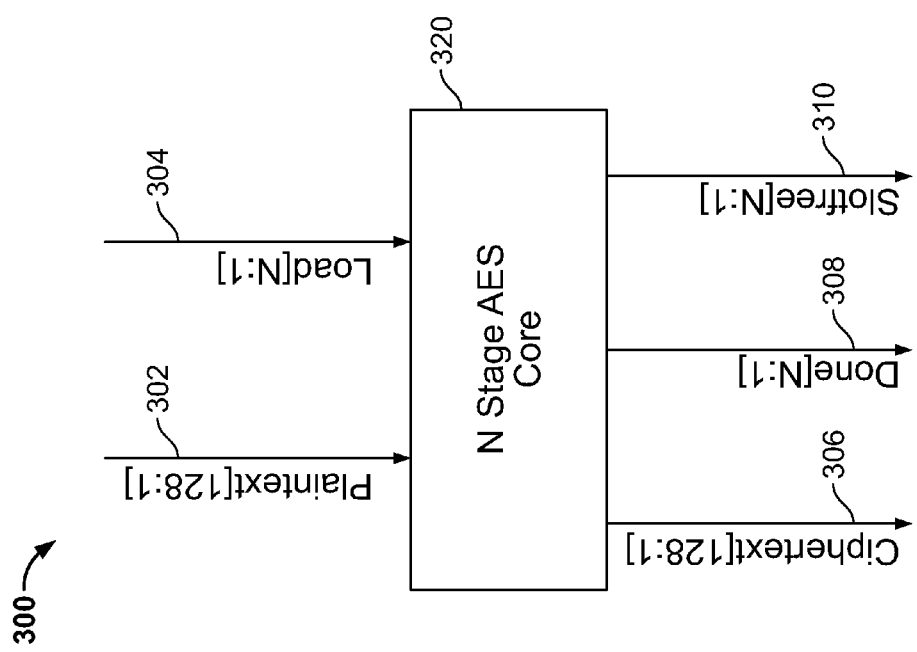
FIG. 3 illustrates an encryption core interface according to one embodiment of the invention.

FIG. 3 illustrates interface 300 to encryption core 320 according to one embodiment of the invention. For example, interface 300 may illustrate the interface to encryption core 100 illustrated in FIG. 1. Interface 300 includes plaintext input 302, load signals input 304, ciphertext outputs 306, done signals output 308, and slotfree signals output 310.

An input plaintext block, e.g., a block similar to input block 112 of FIG. 1, is fed through plaintext input 302. Ciphertext output 306 outputs a corresponding output ciphertext block, e.g., ciphertext 204 of FIG. 1. The input plaintext block may originate from a single bus or source or it can originate from N individual busses. Similarly, an output ciphertext block may be output into a single bus or N individual busses.

Load signal input 304 may include N load signal values, one for each register. Each load signal may be used to initialize one of the N registers with an input plaintext block. For example, load signals input 304 may correspond to load signals 102, 104, 106, and 108 of FIG. 1 above.

Done signals output 308 may represent done signals 432 of FIGS. 1 and 2 above. As explained in connection with FIGS. 1 and 2, each register corresponds to a timeslot in the AES pipeline. Up to N states can exist in the pipeline simultaneously. One of the N states (the one associated with the current timeslot) is selected and inserted it into the pipeline. In other words, of the up to N simultaneous operations in the pipeline, each timeslot corresponds to one of the N registers, one for each possible operation. A register (and by extension the corresponding timeslot) may have its own done signal, which remains asserted (e.g., set to '1') until that timeslot has its register re-initialized with a new input plaintext block. In other words, the done signal may be asserted when processing for its associated register completes, and remains asserted until it is reset (e.g., set to '0') by loading of a new input plaintext block.

Each timeslot has a signal to indicate when it is loadable. Slotfree signals output 310 represents the slotfree signal output for each one of the N timeslots. As explained above in connection with slotfree signals 434 of FIGS. 1 and 2, a slotfree signal for a particular timeslot may lead the actual available clock cycle by several clock cycles. For example, a slotfree signal for block 2 may always lead the current clock cycle by 3 clock cycles. This may allow the load arbitration logic to anticipate availability of registers in the array, and thereby to optimize distribution of data upon the multiple cores. This may be useful if the input arbitration logic for the array of cores is deep and requires pipelining.

Figure 4:
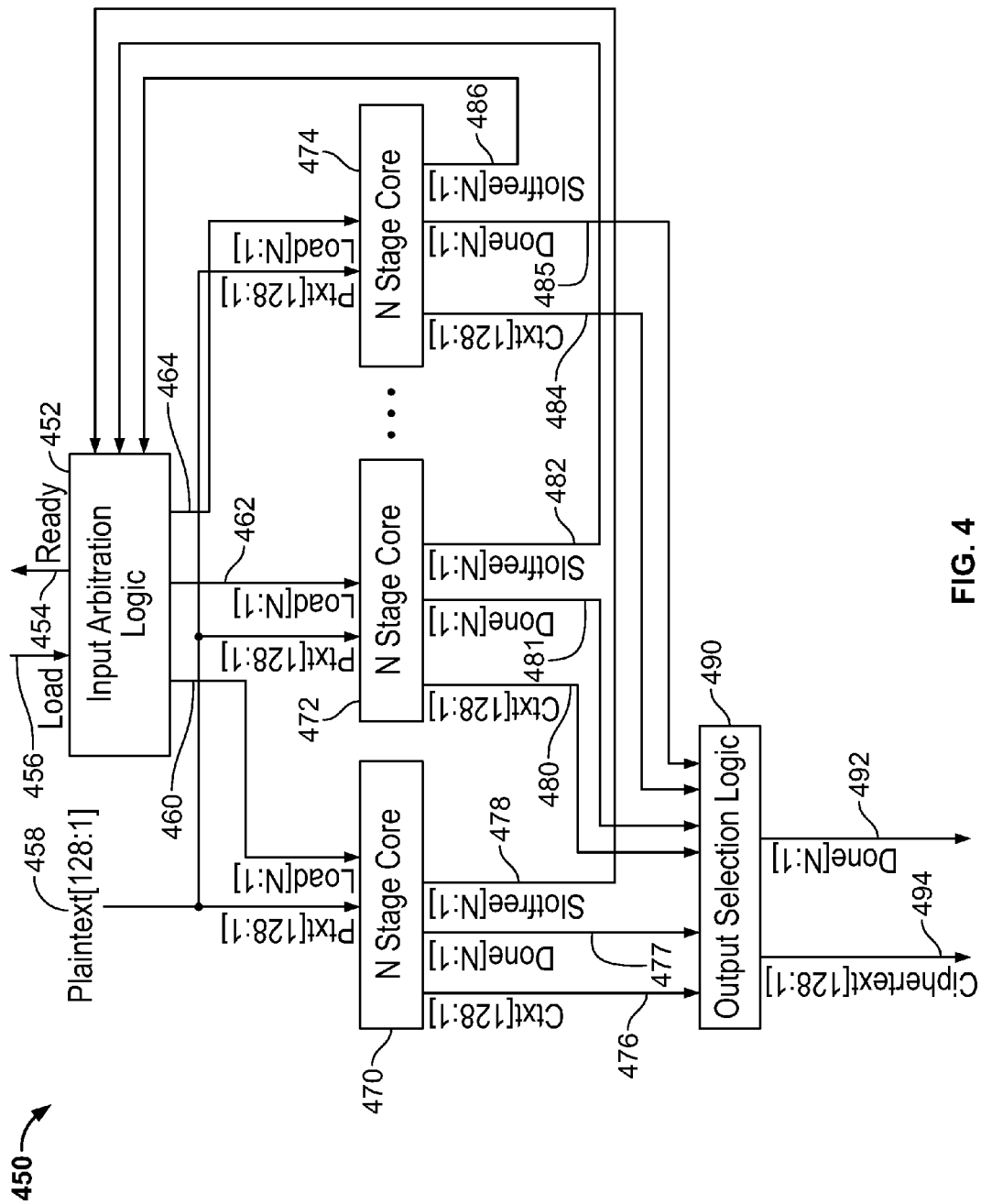
FIG. 4 is a block diagram of an array encryption architecture according to one embodiment of the invention.

FIG. 4 is a block diagram of an array encryption architecture 450 according to one embodiment of the invention. Array encryption architecture 450 includes input arbitration logic 452, M encryption cores 470 through 474, and output selection logic circuitry 490.

A single plaintext input bus 458 may be provided.

Input arbitration logic 452 includes a load signal input 456 that indicates whether a new input plaintext block has been loaded through input bus 458. Input arbitration logic 452 also includes a ready signal input 454 that indicates whether there is availability in the array for an input plaintext data to be loaded (i.e., an available one of the N registers in one of the M cores). Input arbitration logic 452 generates load signals output 460, 462, and 464 for each one of the encryption cores. Each load signals output includes N signal values, one for each timeslot in each encryption core.

Encryption cores 470, 472, and 474 may each be implemented similarly to encryption core 100 of FIG. 1, with an interface as described in FIG. 3. As explained above, each one of the M encryption cores may process up to N blocks simultaneously, and may include control logic for keeping track of up to N encryption operations during N timeslots. Each data block that is loaded into a core at a particular timeslot is assigned to one of N registers. Each core therefore may process multiple blocks (up to N blocks) per pipeline, during N timeslots.

Each core may generate N done signal values. For example, core 470 generates N done signal values 477, core 472 generates N done signal values 481, and core 474 generates N done signal values 485. As explained in reference to done signals 432 of FIGS. 1 and 2, each done signal value may indicate whether a corresponding one of the N registers has been re-initialized with a plaintext block. These done signals are provided to output selection logic 490.

Each core may generate N slotfree signal values. For example, core 470 generates N slotfree signal values 478, core 472 generates N slotfree signal values 482, and core 474 generates N slotfree signal values 486. As explained in reference to slotfree signals 434 of FIGS. 1 and 2, each slotfree signal value indicates availability of a corresponding one of the N registers. This availability may lead the current clock cycle by multiple clock cycles. These slotfree signals are provided to input arbitration logic 452 to control which core to load at a particular timeslot.

Output selection logic 490 generates ciphertext output 494 and done signals output 492. Output selection logic 490 is coupled to ciphertext outputs (e.g., ciphertext outputs 476, 480, and 484) of the respective M encryption cores. Output selection logic 490 is also be coupled to done signals outputs (e.g., done signals outputs 477, 481, and 485) of the respective cores.

Each one of the M encryption cores may include control logic for unloading the output of its processing pipeline in the correct order, once processing for the selected pipeline is complete. If more cryptographic rounds are needed, this output may be fed back to the registers. Otherwise, if all encryption rounds have been completed, this output may be provided as ciphertext.

Ciphertext output 494 corresponds to a ciphertext block output by one of the M encryption cores during a current clock cycle. Done signals output 492 may include N signals corresponding to each timeslot N. Each one of the N done signals indicates whether the corresponding timeslot has had its register re-initialized with a new input plaintext block in any one of the M cores. In some implementations, a ciphertext output can be latched from the output of any of the M cores when its corresponding done signal is asserted. Alternatively, multiple ciphertext outputs can be provided from the core, each associated with a done signal.

Up to N (and possibly fewer) active encryption operations may be carried out in the pipeline. Each register corresponds to a timeslot in the pipeline. In the case of a maximum number of cores (i.e., 10 in the case of 128 bit key AES), READY signal 454 is asserted continuously. However, the input arbitration logic would still be needed to ensure that the correct timeslot in the correct core is loaded with the plaintext input.

Array encryption architecture 450 may provide a high performance encryption system. Any number M of cores may be used in parallel, up to the number of rounds in AES for the chosen key size. For 128 bit key AES, up to ten cores may be used in parallel. For 256 bit AES, up to 14 cores may be used. This improves efficiency and performance and maximizes system bandwidth. As the individual encryption cores included in the array can be pipelined to any depth N to achieve a desired system frequency without affecting the encryption algorithm, this method is suitable for both high performance devices (such as STRATIX® devices, with adaptive logic module (ALM) logic structures, available from Altera Corporation, of San Jose, Calif.) or lower performance devices (such as CYCLONE® devices, which have simple 4 look-up tables, also available from Altera Corporation). Using this architecture may allow AES encryption speeds of up to 40 Gbps on a CYCLONE® device, and even higher speeds on a STRATIX® device.

Another advantage of array encryption architecture 450 is that the same architecture may be used, regardless of the particular choices of N and M. This simplifies design and allows a user to support any required throughput with a single top level architecture. Because the system has user definable parallelism (e.g., M parameter) and processing depth (e.g., N parameter), any level of performance can be realized on any device or speed grade, simply by increasing resources, e.g., number of cores. For example, this same array architecture may be used on a fast speed grade device or a slow device, with throughput governed by the N and M parameters.

One embodiment of the input arbitration logic 452 for the case of M=4 cores will be described in FIG. 5 below. This embodiment is illustrative, and it should be understood that any other suitable configurations and circuitries may be used to implement input arbitration logic 452.

Figure 5A:
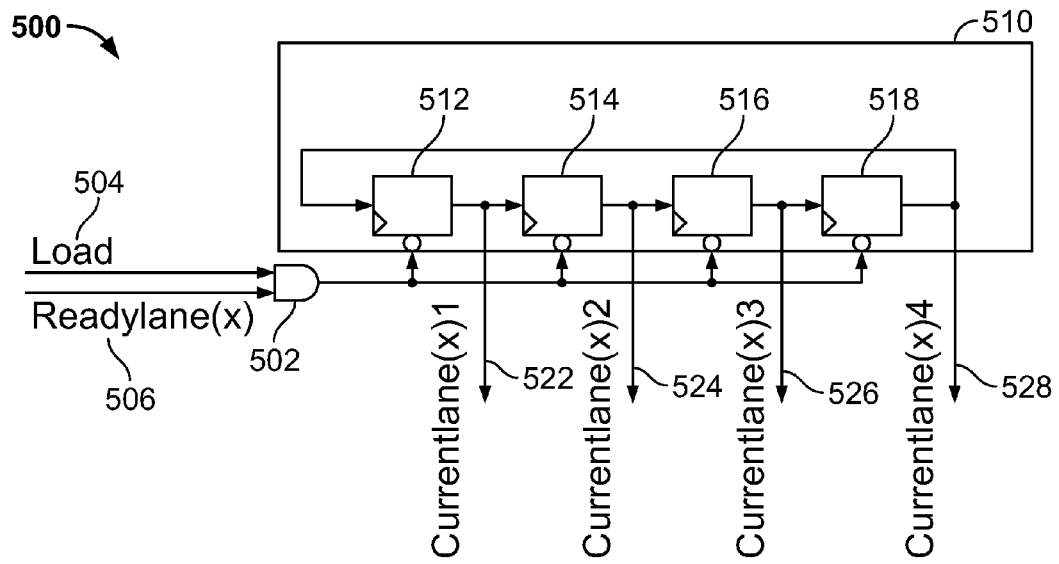
FIGS. 5A, 5B, 5C, and 5D (hereinafter collectively referred to as "FIG. 5") illustrate one possible configuration of circuitries usable for a portion of earlier-described embodiments of the invention.

FIG. 5A illustrates circuitry 500 for selecting one of the M encryption cores for loading a particular timeslot. Circuitry 500 includes circular shift register 510 and AND gate 502. Each timeslot is given a lane index x, which varies from 1 to N. Input arbitration logic 452 may include N circuitries 500, one for each value of lane index x.

A first input of the AND gate 502 may correspond to a LOAD signal 504. LOAD signal 504 indicates whether a new data block is loaded into the array in a current clock cycle. LOAD signal 504 may be the same as LOAD signal 456 of FIG. 4 and indicate whether a new data block 458 has been loaded in any of the encryption cores 470 through 474.

A second input of the AND gate 502 corresponds to Readylane(x) signal 506. Readylane(x) signal 506 indicates whether a timeslot corresponding to lane index x (hereinafter timeslot x) is available in any of the M cores during the current clock cycle.

Circular shift register 510 is initialized so that a different one of the M encryption cores is selected during subsequent loads for the particular timeslot with which circuitry 500 is associated. Circular shift register 510 may include M=4 flip flop registers 512, 514, 516, and 518, one for each encryption core. During initialization of circular shift register 510, register 512 may be initially set to '1' and registers 514, 516, and 518 may be initially set to '0'. After a block is loaded at timeslot x of the first core (the first core corresponding to register 512), the values of the flip flop registers may be shifted to the right by one position. For example, after a block is loaded to the first core, register 514 may be set to '1' and registers 512, 516, and 518 may be set to '0'.

Circuitry 500 outputs M CurrentlLane(x)$_i$ signal values 522, 524, 526, and 528, one for each encryption core i (with i=1, 2, . . . , M). A CurrentlLane(x)$_i$ signal value of '1' indicates that core i is the next core scheduled for loading at timeslot x. This CurrentlLane(x)$_i$ signal value is used in circuitry 530 of FIG. 5B below for loading the currently selected core at timeslot x (i.e., corresponding to the currently asserted CurrentlLane(x)$_i$ signal value). After a block has been loaded to core i at timeslot x, a different core is selected the next time a block is loaded at timeslot x (i.e., as data is shifted in circular shift register 510). Circuitry 500 can thus cycle through all available cores, selecting different ones of the cores for successive loads at timeslot x.

Figure 5B:
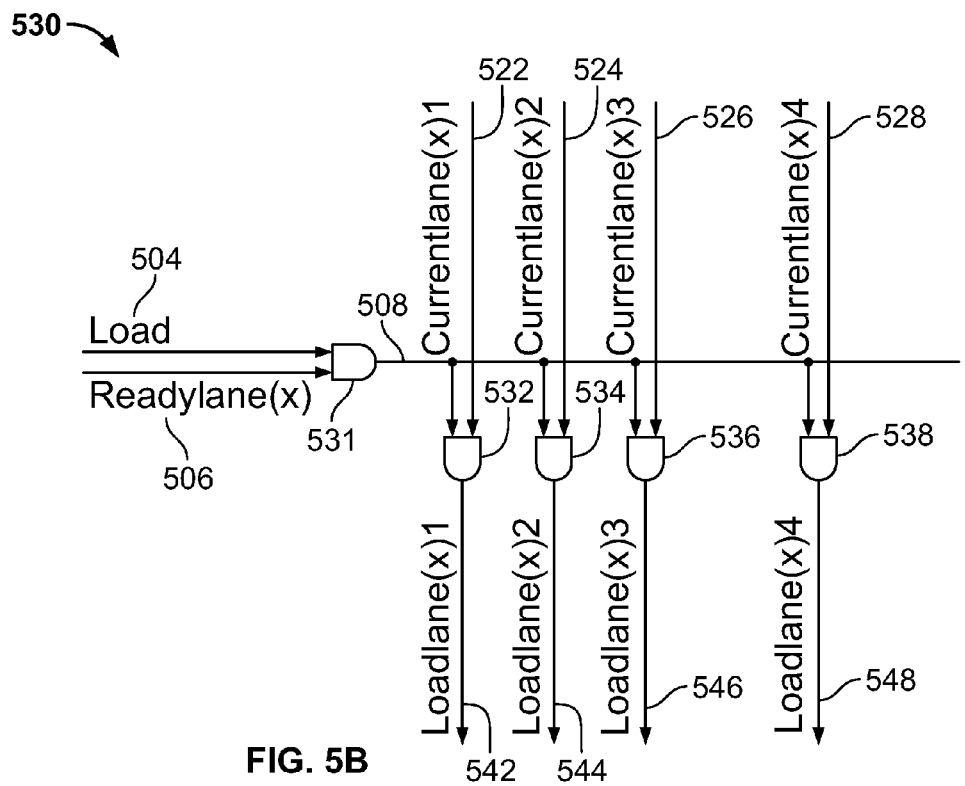

FIG. 5B illustrates circuitry 530 for generating M LoadLane(x)$_i$ signal values, one for each core i. LoadLane(x)$_i$ signal value is used for enabling loading timeslot x of core i. Circuitry 530 includes AND gates 531, 532, 434, 536, and 538. AND gate 531 may be similar to gate 502 of FIG. 5A. If a new data block is loaded in the current clock cycle (i.e., LOAD signal 504 is set to '1'), and timeslot x is available in any of the M cores (i.e., Readylane(x) 506 is set '1'), then the output of AND gate 531 may be set to '1'. If, in addition, the core that timeslot x is valid for is the next core scheduled for loading (i.e., Currentlane(x)$_i$ is set '1'), then the corresponding LoadLane(x)$_i$ signal value may be set to '1'. In other words, core i will be loaded at timeslot x.

Figure 5C:
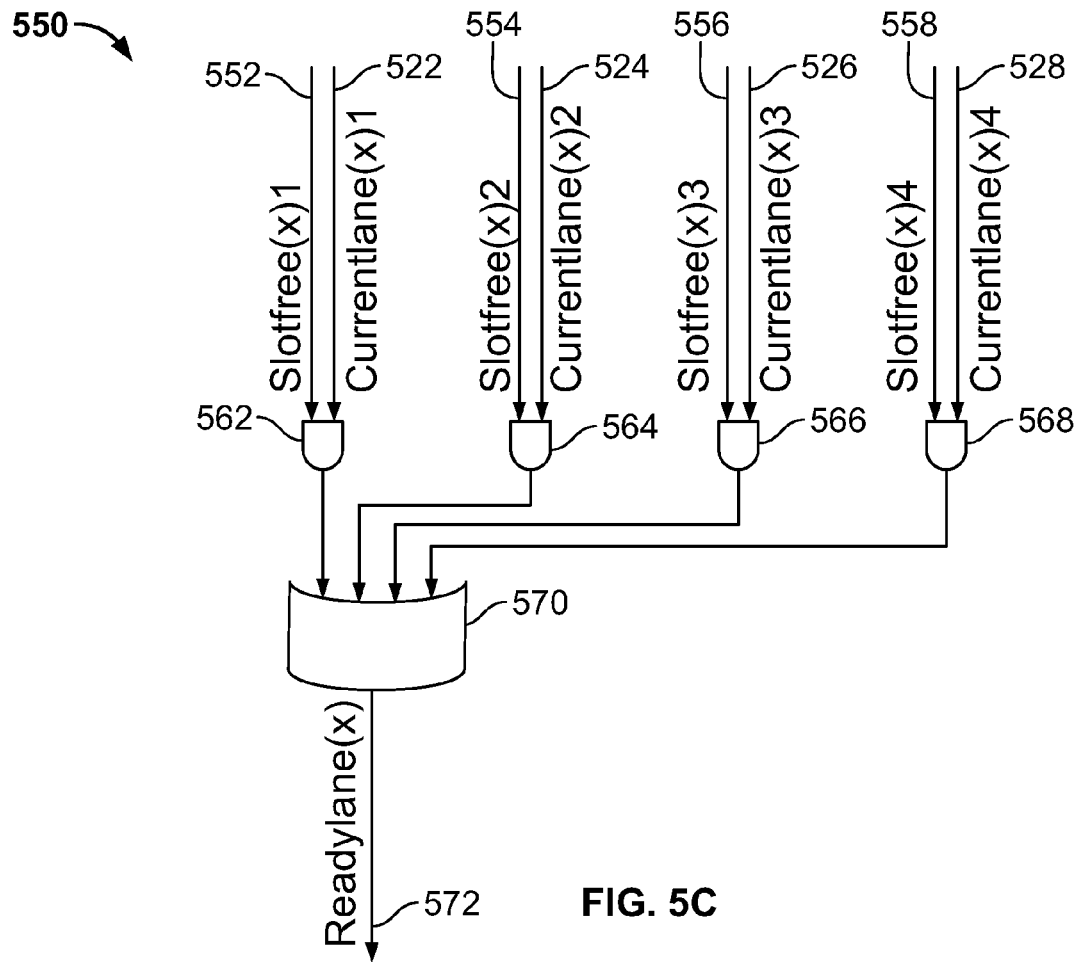

FIG. 5C illustrates circuitry 550 for generating Readylane (x), e.g., Readylane(x) signal values 506 of FIGS. 5A and 5B above. FIG. 5C includes AND gates 562, 564, 566, and 568, and OR gate 570. Slotfree(x)$_i$ signal values 552, 554, 556, and 558, and Currentlane(x)$_i$ signal values 522, 524, 526, and 528 corresponding to core i=1,..., M, is input into AND gates 562, 564, 566, and 568, respectively. Slotfree(x)$_i$ signal values 552, 554, 556, and 558 may be output by core i as explained above.

If a timeslot x is available for the next core to be loaded and for the next available timeslot (i.e., both Slotfree(x)$_i$ and Currentlane(x)$_i$ are asserted), then timeslot x will be available somewhere in the array (i.e., Readylane(x) is asserted). Multiple time slots may be available during any clock cycle across the array. Using circuitry 550, input arbitration logic thus ensures that only one such available timeslot is selected for loading during any clock cycle.

Figure 5D:
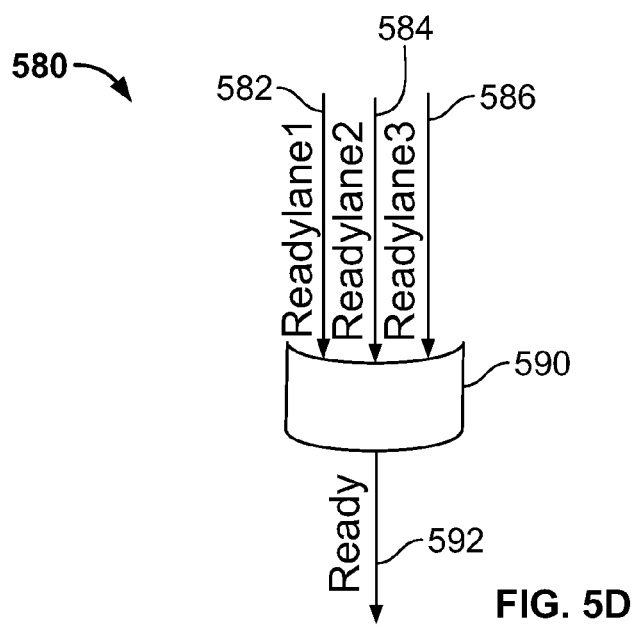

FIG. 5D illustrates circuitry 580 for generating READY signal 592 (e.g., similar to READY signal 454 of FIG. 4). Circuitry 580 asserts READY signal 580 if any timeslot x is available anywhere in the array (i.e., if any Readylane(x) is asserted for any x=1, . . . , N). Circuitry 580 thus indicates that another load is possible if input data is available.

Upon a reading of the above disclosure, one of skill in the art familiar with the AES algorithm will be able to implement a similar core architecture for decryption of ciphertext. The same architecture is used with the AES algorithm pipeline having its various processing units reversed. Thus, the first transformation step in the pipeline is the inverse of the "add round key" transformation, the second step is the "inverse mix columns" transformation, the third step is the "inverse shift rows" transformation, and the final step is the "inverse substitute bytes" transformation which uses an inverse S-Box. The key round generator basically runs in reverse. One technique would be to calculate all round keys first and then apply them in reverse order.

It will be understood that the foregoing is only illustrative of the principles of the invention, and that various modifications can be made by those skilled in the art without departing from the scope and spirit of the invention. For example, the various elements of this invention can be provided on in a fixed logic device, or can be configured into a programmable integrated circuit device such as a programmable logic device (PLD) in any desired number and/or arrangement. One skilled in the art will appreciate that the present invention can be practiced by other than the described embodiments, which are presented for purposes of illustration and not of limitation, and the present invention is limited only by the claims that follow.

What is claimed is:

1. Circuitry for encrypting data using a cryptographic algorithm, said circuitry comprising:
    a plurality of encryption cores, each encryption core having at least a respective data input for receiving respective data blocks and a respective control input for receiving a respective load signal;
    input arbitration logic circuitry coupled to said plurality of encryption cores, wherein said input arbitration logic is operable to:
        select one of said encryption cores for loading a block of data;
        provide an enable load signal to the control input of said selected encryption core, wherein in response to receiving the enable load signal from the input arbitration logic circuitry, said block of data is loaded into the data input of the selected encryption core; and
        receive a plurality of timeslot availability signals from each encryption core, wherein said providing the enable load signal is based on the received plurality of timeslot availability signals from each encryption core.

2. The circuitry for encrypting data of claim 1 wherein each one of said encryption cores comprises a plurality of registers.

3. The circuitry for encrypting data of claim 2 wherein said input arbitration logic is further operable to:
    select said encryption core for loading said block of data during a particular timeslot; and
    generate said enable load signal for one of said registers in said selected encryption core, wherein said register corresponds to said particular timeslot in said selected encryption core.

4. The circuitry for encrypting data of claim 3 wherein each timeslot availability signal is indicative of availability of a timeslot for loading a corresponding register in each encryption core.

5. The circuitry for encrypting data of claim 4 wherein each timeslot availability signal indicates anticipated availability of said timeslot for loading said corresponding register in each encryption core.

6. The circuitry for encrypting data of claim 4 wherein each timeslot availability signal leads a current clock cycle by a plurality of clock cycles.

7. The circuitry for encrypting data of claim 1 wherein each one of said encryption cores is operable to perform a plurality of simultaneous encryption operations corresponding to said cryptographic algorithm on a respective plurality of data blocks.

8. The circuitry for encrypting data of claim 7 wherein:
    each one of said encryption cores comprises a plurality of registers; and
    each one of said registers is loaded with a round state for one of said encryption operations.

9. The circuitry for encrypting data of claim 1 wherein each one of said encryption cores further comprises a pipeline processing unit arranged to perform a round of processing upon said block using said cryptographic algorithm, said pipeline processing unit receiving a round key for each round of processing upon said block.

10. The circuitry for encrypting data of claim 9 wherein each one of said encryption cores further comprises:
    a key round generator that generates round keys for said pipeline processing unit using a cipher key; and
    a plurality of N key memory devices, each key memory device arranged to hold said round keys.

11. The circuitry for encrypting data of claim 10 wherein each one of said encryption cores further comprises a plurality of read counters each corresponding to one of said key memory devices, each read counter indexing one of said round keys in one of said corresponding key memory devices thereby enabling said indexed round key to be input to said pipeline processing unit.

12. The circuitry for encrypting data of claim 1 further comprising output selection logic circuitry for generating blocks of encrypted output data, wherein said output selection logic circuitry is coupled to said encryption cores.

13. A method of encrypting data using a cryptographic algorithm, said method comprising:
    selecting one of a plurality of encryption cores for loading a block of data, wherein each encryption core has at least a respective data input for receiving respective data blocks and a respective control input for receiving a respective load signal, wherein said selected encryption core is operable to load said block of data in response to said load signal;
    providing an enable load signal using input arbitration logic circuitry to the control input of said selected encryption core;
    loading said block of data into the data input of said selected encryption core; and
    receiving a plurality of timeslot availability signals from each encryption core, wherein said providing the enable load signal is based on the received plurality of timeslot availability signals from each encryption core.

14. The method for encrypting data of claim 13 wherein each one of said encryption cores comprises a plurality of registers.

15. The method for encrypting data of claim 14 wherein said loading said block of data comprises loading said block of data into one of said registers in said selected encryption core, wherein said register corresponds to a particular timeslot in said selected encryption core.

16. The method for encrypting data of claim 15, wherein each timeslot availability signal is indicative of availability of a timeslot for loading a corresponding register in each encryption core.

17. The method for encrypting data of claim 16 wherein each timeslot availability signal indicates anticipated availability of said timeslot for loading said corresponding register in each encryption core.

18. The method for encrypting data of claim 13 further comprising selecting each block in turn to enter a pipeline processing unit in said selected encryption core, said pipeline processing unit being arranged to:
    perform a round of processing upon said block using said cryptographic algorithm; and
    receive a round key for each round of processing upon said block.

19. The method for encrypting data of claim 18 further comprising:
    generating said round keys for said pipeline processing unit using a cipher key; and
    storing said round keys in a plurality of N key memory devices.

20. The method for encrypting data of claim 19 further comprising indexing each of said key memory devices with a read counter in order to output from each of said key memory devices and into said pipeline processing unit one of said round keys appropriate for said round of encryption.

21. Circuitry for encrypting data using a cryptographic algorithm, said circuitry comprising:
   an encryption core comprising a plurality of registers, each register being operable to load a block of data during a particular timeslot in response to a respective load signal received by said register;
   a pipeline processing unit arranged to perform a round of processing upon said block using said cryptographic algorithm, said pipeline processing unit receiving a round key for each round of processing upon said block; and
   a controller for generating timeslot availability signals, wherein each timeslot availability signal is indicative of availability of a timeslot for loading a corresponding register in said encryption core.

22. The circuitry for encrypting data of claim 21 wherein said controller is configured for generating a plurality of done indicators, each done indicator corresponding to one of said registers, wherein each of said done indicators is set when said corresponding block has finished being encrypted.

23. The circuitry for encrypting data of claim 21 wherein said timeslot availability signal indicates anticipated availability said timeslot for loading said corresponding register in said encryption core.

24. The circuitry for encrypting data of claim 23 wherein the timeslot availability signal leads a current clock cycle by a plurality of clock cycles.

\* \* \* \* \*